INVENTOR
ROBERT E. WOOD

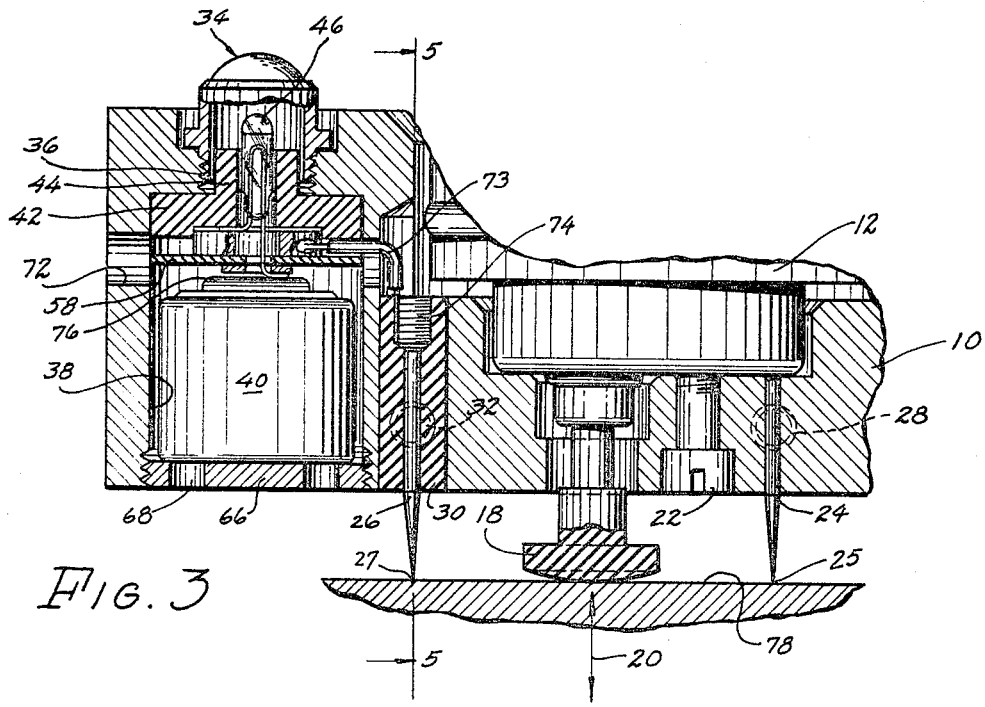
Fig. 3
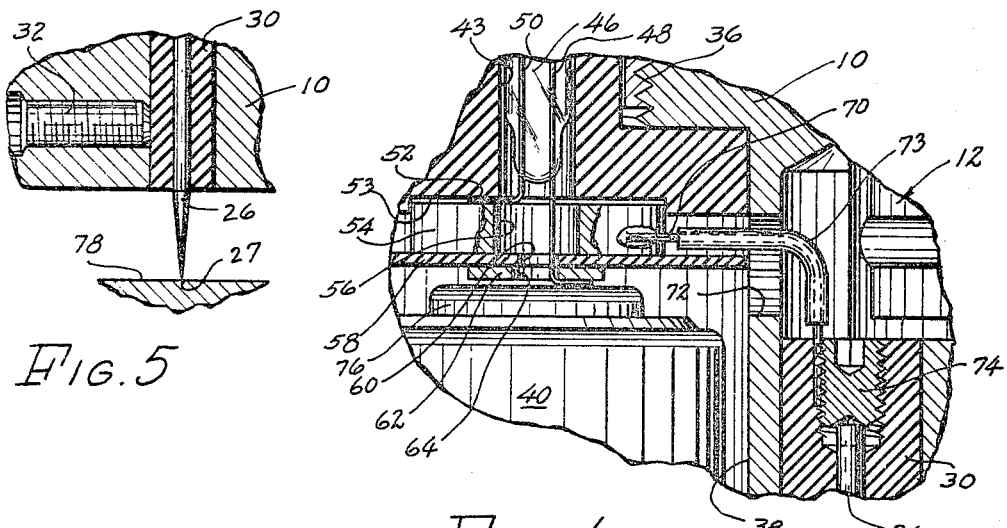
Fig. 5
Fig. 4
INVENTOR
ROBERT E. WOOD
BY
Axel H. Johnson,
AGT.

INVENTOR
ROBERT E. WOOD

United States Patent Office 3,432,933
Patented Mar. 18, 1969

3,432,933
GAUGE FOR MEASURING THE THICKNESS OF BLANKETS ON PRINTING ROLLERS
Robert E. Wood, Racine, Wis.
(R.D. 1, Box 332C, Ashland, Ohio 44805)
Filed Nov. 14, 1966, Ser. No. 593,765
U.S. Cl. 33—172
Int. Cl. G01b 3/22
2 Claims

ABSTRACT OF THE DISCLOSURE

A portable gauge that enables a pressman to determine the thickness of the resilient blanket and packing overlaying a printing press cylinder is provided with a pair of spaced prods that penetrate the blanket and packing to establish electrical contact with the cylinder, thereby actuating a signal means. A dial indicator engages the upper surfaces of the blanket to indicate the thickness thereof with respect to the surface of the cylinder.

---

This invention comprises a portable gauge for measuring the thickness and uniformity of the blankets and packing on the cylinders of offset printing presses. The impression cylinder and the "blanket" cylinder of these presses are each provided with cylindrical "bearers" or enlargements at each end which roll in contact with those on the other roll or cylinder. These bearers maintain the cylindrical surfaces of the co-operating cylinders at a uniform radial distance from each other. The blanket receives the ink impression from the plate cylinder, not shown, and which impression is transferred to the paper being printed, as the latter passes between the blanket and the impression cylinder. It is important that the blanket surface be of a uniform height with respect to the bearers to permit the paper to pass between the cylinders with sufficient pressure being applied to obtain a satisfactory impression. A factor in obtaining a satisfactory impression is to maintain a uniform thickness of the blanket and packing over the entire surface of the cylinder. This invention permits the detection of local high-and-low areas on the blanket surface.

It is an object of this invention to provide a portable instrument that will permit a pressman to determine the total thickness and uniformity of the packing and blanket at various points on a cylinder rapidly and accurately, and without injuring the blanket surface.

Another object is to provide an instrument that will permit measuring the height of the bearer relative to the cylinder surface after the packing and blanket has been applied thereto.

Further objects and advantages of the invention will become apparent from a consideration of the following detailed description taken in connection with the accompanying drawings, wherein an embodiment of the invention is shown. However, it is to be understood that the invention is not limited to the details disclosed, but includes all such variations and modifications as fall within the spirit of the invention. Referring to the drawings:

FIG. 3 is an enlarged sectional view of a portion of FIG. 2.

FIG. 4 is an enlarged fragmentary sectional view of a portion of FIG. 3.

FIG. 5 is an enlarged sectional view of a portion of FIG. 3, taken at 5—5.

Figure 1:
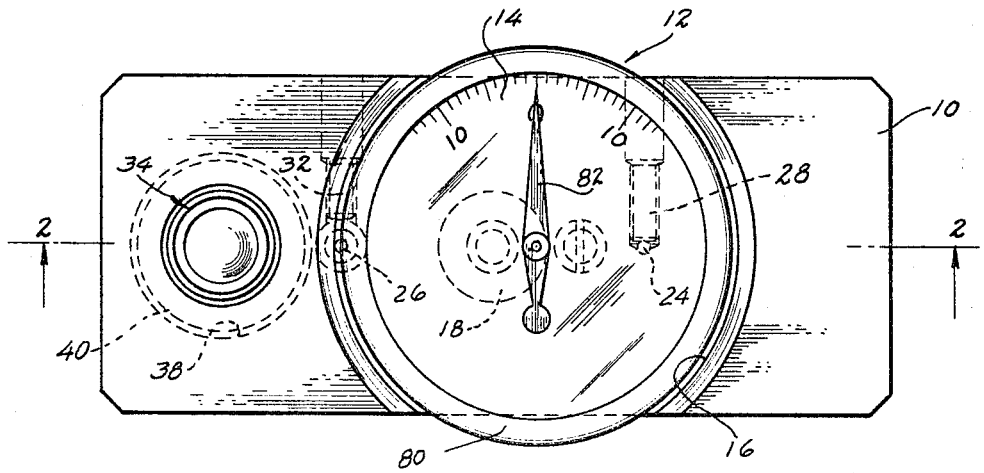
FIG. 1 is a plan view of one form of the gauge.

Referring again to the drawings: The gauge of FIGS. 1 through 5 comprises a body 10 which in this instance is of conductive material such as metal, or any material that will conduct electricity. A dial indicator 12 of the type having a rotatable dial 14, is positioned in a chamber 16 provided in body 10, and which chamber conforms to the body of the indicator. This indicator is provided with an anvil member 18 of insulating material, and which extends through an aperture in body 10, and is displaceable in the directions shown by arrow 20 of FIG. 3. A screw 22 secures indicator 12 in place in the chamber 16. Other details of indicator 12 will be made clear as the description proceeds: However, it is of the type commonly used by machinists.

A pair of contact prods comprising a first prod 24 and a second prod 26, are positioned at equal distances from the indicator anvil 18, one prod on either side of the anvil. The axes of prods 24 and 26, and anvil 18 lie in a common plane. Prods 24 and 26 are of steel, of a cylindrical shape, and have very hard acute conical points 25 and 27, respectively. The shanks of prods 24 and 26 are drawn to a lower temper to avoid breakage. Prod 24 is fitted into a hole in body 10 thus establishing electrical contact with the latter, and a set screw 28 secures the prod against axial displacement. Prod 26 is similar to prod 24 but the former is mounted in a bushing 30 of insulating material. Bushing 30 is fitted in a hole in body 10. Prod 26 is firmly fitted into an axial hole in the bushing. A set screw 32 in body 10 holds bushing 30 securely in place. When set screw 32 is driven, bushing 30 will yield sufficiently so as to also secure prod 26 against axial displacement.

A standard commercially-available "jewel" lens 34 is threadedly engaged in body 10 as at 36. Body 10 has a chamber 38 provided therein to receive a mercury cell 40 of 1.4 volt rating. A lamp bushing 42 of insulating material and of a cylindrical shape is fitted into chamber 38 and has a cylindrical portion 44 which extends into the bore of lens 34. Bushing 42 has an axial bore 43 into which a sub-miniature lamp 46 of the end-lens type is fitted. This lamp is rated at 1.5 volts. Lamp 46 has leads 48 and 50 as shown in FIGS. 3 and 4. Lead 50 extends downwardly and is formed to engage the lower surface of bushing 42, as at 52. A metal washer 54 is positioned in contact with lead 50 as shown in FIG. 4, being centered in a recess 53, of bushing 42. Lead 48 extends downwardly through an aperture 56 in washer 54 but does not contact the washer. An insulating washer 58 having a force fit in chamber 38, is next placed in contact with washer 54, and has an aperture 60 through which lead 48 extends. A metal washer 62 is then placed in contact with washer 58 and which washer has an aperture 64. Lead 48 extends through aperture 64 and is then formed over the lower face of washer 62 as shown in FIG. 4: Thus lead 48 is in electrical contact with washer 62. Cell 40 is then inserted in chamber 38. A threaded disc 66 having spanner holes 68 is then inserted into corresponding threads in chamber 38 so as to place cell 40, by means of electrode 76, in electrical contact with the lead 48. A lead 70 is soldered or otherwise secured to the periphery of washer 54 as shown in FIGS. 3 and 4. An aperture 72 is provided, having been made by drilling from the outside of body 10. Lead 70 is covered by an insulating sleeve 73 to prevent "shorting" to body 10.

A set screw 74 of the socket type is provided in the upper end of bushing 30. The bushing has been tapped with a thread to receive screw 74. Lead 70 is inserted into the tapped hole as shown in FIG. 4, and the screw is then inserted in the hole; the soft insulating material yielding sufficiently to permit the lead 70 to be imbedded therein by the screw. Thus electrical contact is established between lead 70 and screw 74. Prod 26 is provided with a cone-shaped upper end, and screw 74, having a cone-shaped cavity, is turned to make contact with the end of prod 26, assuring electrical contact between prod 26 and lead 50 of lamp 46. The casing of cell 40 is electrically connected to body 10 and prod 24 by means of disk 66. The center electrode 76 of cell 40 is in electrical contact with lead 48. Thus lamp 46 will receive current only when points 25 and 27 of prods 24 and 26 contact a common conducting surface.

Prior to using the gauge, points 25 and 27 are placed on a flat reference surface of metal such as 78, causing the lamp 46 to glow. With contact anvil 18 engaging plate or reference surface 78, gauge indicator bezel 80 is turned so that hand 82 indicates a "zero" reading: The gauge during the setting being rocked on the points 25 and 27 to assure that the "zero" reading is obtained while the prod axes are perpendicular to the reference surface of plate 78. The gauge is now ready to be used in determining the thickness of the blanket and packing on a cylinder 84.

Figure 2:
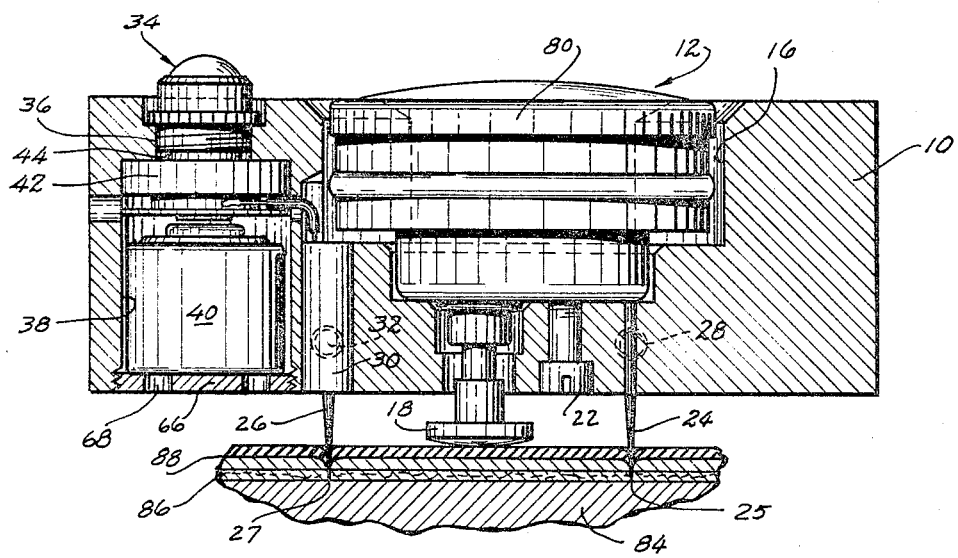
FIG. 2 is sectional view taken at 2—2 of FIG. 1.

FIG. 2 shows a fragment of a cylinder 84 having a packing 86 of paper called a tympan and the blanket 88; the latter having a fabric backing, and an elastomer surface which receives the ink from the inking rollers. The gauge is positioned on the blanket so that the axes of the prods 24 and 26 lie in a plane including the axis of the cylinder 84. The gauge is then pressed so that the points 25 and 27 penetrate the blanket 88 and the tympan 86 until lamp 46 glows, indicating contact of the prods with the metal cylinder 84; the indicator anvil resting upon the blanket will determine the height of the latter with respect to the cylinder surface. The reading on the dial 14 is then noted. During this reading the gauge is again rocked to assure that the minimum reading is being indicated. The above operation is repeated by shifting the gauge axially or peripherally about the surface to determine uniformity of the blanket and packing at various areas.

Figure 6:
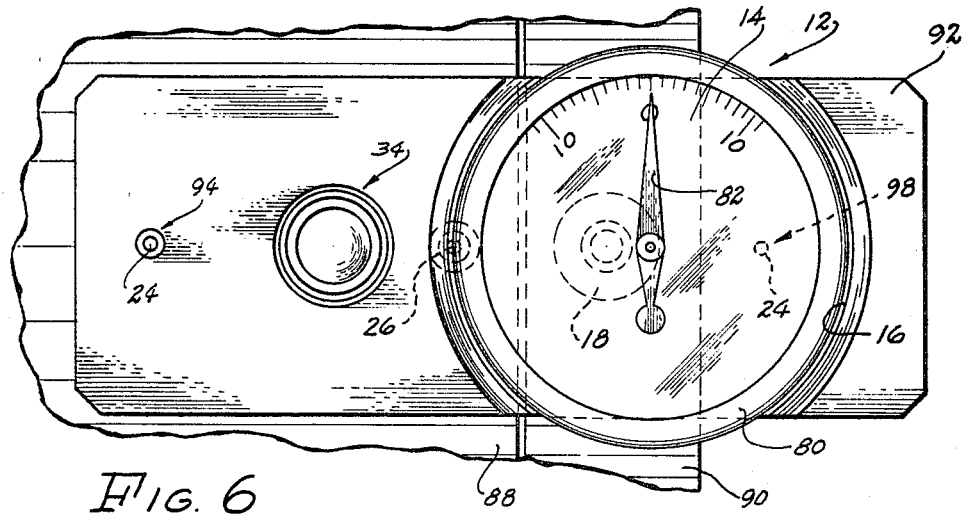
FIG. 6 is a plan view of a modified form of the gauge of FIGS. 1 and 2, but embracing the same invention.
Figure 7:
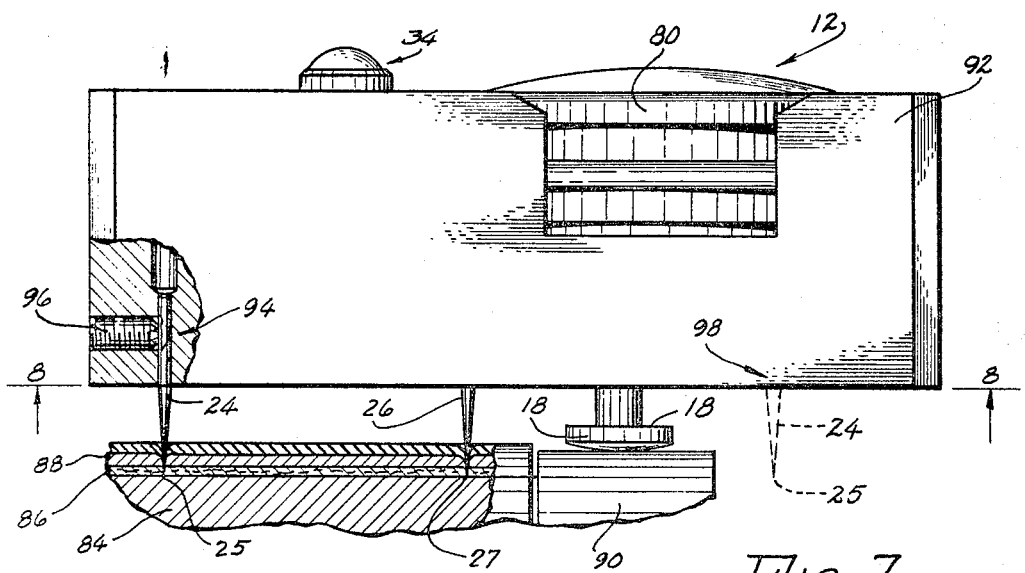
FIG. 7 is an elevational view of the gauge of FIG. 6 with parts broken away and showing the gauge as used when measuring near the bearer.
Figure 8:
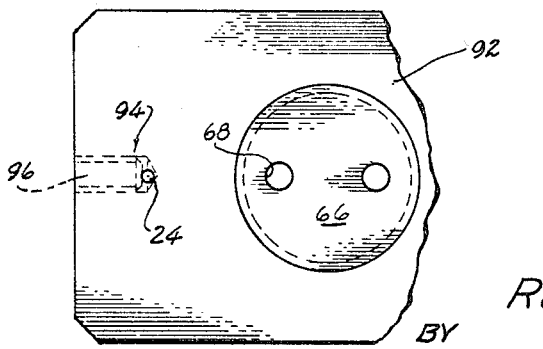
FIG. 8 is a fragmentary view taken at 8—8 of FIG. 7.

FIGS. 6, 7 and 8 show a modification of the gauge to permit measurements being taken close to the bearers such as 90. In this modification, the body 92 extends so as to provide an alternate position for prod 24, as at 94. A set screw 96 is located so as to securely hold needle 24 in place: The prod 24 being grounded electrically to body 92 as was true in the gauge of FIG. 1. The original position of prod 24 is indicated at 98 of FIG. 7. This modified form of gauge is set in the same manner as was done with respect to the previously-described gauge.

When using the modified gauge as shown in FIG. 7, it is placed with the prods 24 and 26 penetrating the blanket 88 and packing 86, and with the anvil 18 resting upon the bearer 90 until the lamp 46 glows: The dial reading then indicates the height of the bearer relative to the surface of the cylinder.

It is also possible to determine the height of the blanket relative to the bearer 90 in the following manner: A reading is taken with the anvil resting upon the blanket. Another reading is taken with the anvil resting upon the bearer 90 as shown in FIG. 7. The difference between the two readings will then be the amount that the blanket surface is above the bearer.

It is obvious that the gauge shown in FIGS. 6 and 7 can be used in the manner of the gauge of FIGS. 1 and 2 by merely removing prod 24 from position 94 and placing it in position as shown by dotted lines as at 98.

The above being a complete description of an illustrative embodiment of the invention, what is claimed as new and desired to be secured by Letters Patent of the United States is:

1. A gauge for measuring the thickness of a layer of nonelectrically-conductive, yieldable material affixed to an electrically-conductive surface, comprising, in combination an electrically-conductive body, a first prod and a second prod protruding from and integrally fixed in said body against displacement therewith, and having axes spaced apart and lying in a common plane, said prods terminating in acute conical points adapted to penetrate said yieldable material and to simultaneously contact said surface, said first prod being in electrical contact with said body, said second prod being insulated from said body, an electrical power source having a pair of poles, one of said poles contacting said body, a means of indicating mutual contact of said prods with said surface upon penetration of said meterial, said means having a pair of leads, one of said leads being connected to the other of said poles, said other lead being connected to said second prod, and displacement indicating means intermediate said prods having a contact anvil adapted to engage the surface of said layer.

2. A gauge in accordance with claim 1, in which one of said prods is positioned intermediate said contact anvil and the other of said prods.

References Cited

UNITED STATES PATENTS

| 2,664,640 | 1/1954 | Euverard | 33—172 |
| 1,927,821 | 9/1933 | Abbott | 33—169 |

FOREIGN PATENTS 817,631  1959  Great Britain.

LEONARD FORMAN, *Primary Examiner.*

R. A. FIELDS, *Assistant Examiner.*

U.S. Cl. X.R.

33—169